United States Patent [19]

Hoskin

[11] Patent Number: 4,926,943

[45] Date of Patent: May 22, 1990

[54] PHENOLIC AND NAPHTHOLIC ESTER CROSSLINKED POLYMERIC GELS FOR PERMEABILITY PROFILE CONTROL

[75] Inventor: Dennis H. Hoskin, Lawrenceville, N.J.

[73] Assignee: Mobil Oil Corporation, New York, N.Y.

[21] Appl. No.: 322,337

[22] Filed: Mar. 10, 1989

[51] Int. Cl.$^5$ ..................... E21B 33/138; E21B 43/22; E21B 43/24

[52] U.S. Cl. .................... 166/270; 166/272; 166/273; 166/274; 166/295; 523/130

[58] Field of Search ............... 166/270, 272, 274, 294, 166/295, 300, 303; 523/130; 252/8.554

[56] References Cited

U.S. PATENT DOCUMENTS

| | | | |
|---|---|---|---|
| 3,243,000 | 3/1966 | Patton et al. | 175/65 |
| 3,305,016 | 2/1967 | Lindblom et al. | |
| 3,573,263 | 3/1971 | Gill. | |
| 3,810,882 | 5/1974 | Browning et al. | |
| 3,918,521 | 11/1975 | Snavely, Jr. et al. | 166/272 |
| 4,009,755 | 3/1977 | Sandiford | 166/270 |
| 4,069,869 | 1/1978 | Sandiford | 166/270 |
| 4,342,866 | 8/1982 | Kang et al. | 536/119 |
| 4,404,296 | 9/1983 | Schäpel | 523/130 X |
| 4,413,680 | 11/1983 | Sandiford et al. | 166/270 |
| 4,440,228 | 4/1984 | Swanson | 166/274 |
| 4,479,894 | 10/1984 | Chen et al. | 252/8.554 |
| 4,489,783 | 12/1984 | Shu | 166/272 |
| 4,565,249 | 1/1986 | Pebdani et al. | 166/303 |
| 4,606,407 | 8/1986 | Shu | 166/270 |
| 4,644,020 | 2/1987 | Stahl | 522/79 |
| 4,776,398 | 10/1988 | Chu et al. | 166/295 X |
| 4,782,901 | 11/1988 | Phelps et al. | 166/270 |
| 4,793,416 | 12/1988 | Mitchell | 166/270 X |
| 4,799,548 | 1/1989 | Mumallah et al. | 166/270 X |
| 4,804,043 | 2/1989 | Shu et al. | 166/270 X |

*Primary Examiner*—George A. Suchfield
*Attorney, Agent, or Firm*—Alexander J. McKillop; Charles J. Speciale; Michael J. Mlotkowski

[57] ABSTRACT

An aqueous polymeric gel-forming composition which slowly crosslinks to form stable gels for plugging highly permeable zones in subterranean oil-bearing formations. The composition comprises an aqueous solution of a water-dispersible polymer present in a viscosifying amount and a crosslinking agent present in an amount effective to cause gelation of the polymeric solution which comprises a mixture of an aldehyde and a member selected from the group consisting of phenolic ester, naphtholic esters, halogenated phenolic esters and halogenated naphtholic esters.

15 Claims, No Drawings

PHENOLIC AND NAPHTHOLIC ESTER CROSSLINKED POLYMERIC GELS FOR PERMEABILITY PROFILE CONTROL

FIELD OF THE INVENTION

This invention relates to the recovery of oil from subterranean oil-bearing formations and more particularly to a novel gel-forming composition which utilizes a phenolic or naphtholic ester as a crosslinking agent for a polymeric material. This invention also relates to a method of utilizing the gel-forming composition as a permeability profile control agent for enhancing the recovery of oil.

BACKGROUND OF THE INVENTION

In the production of oil from subterranean formations, it is usually possible to recover only a small fraction of the total oil present in the formation by so-called primary recovery methods which utilize only the natural forces present in the reservoir. To recover oil beyond that produced by primary methods, a variety of supplemental production techniques have been employed. In these supplemental techniques, commonly referred to as secondary recovery operations, a fluid is introduced into the oil-bearing formation in order to displace oil to a production system comprising one or more production wells. The displacing or "drive" fluid may be an aqueous liquid such as brine or fresh water, a gas such as carbon dioxide, steam or dense-phase carbon dioxide, an oil-miscible liquid such as butane, or an oil and water-miscible liquid such as an alcohol. Often, the most cost-effective and desirable secondary recovery methods involve the injection of an aqueous or carbon dioxide flooding medium into an oil-bearing formation, either alone or in combination with other fluids. In practice, a number of injection and production wells are used in a given field. These are generally arranged in conventional patterns such as a line drive, a five spot or inverted five spot, or a seven spot or inverted seven spot.

In the use of the various fluid flooding techniques, it has become a common expedient to add various polymeric thickening agents to the drive fluid to increase its viscosity to a point where it approaches that of the oil which is desired to be displaced, thus improving the displacement of oil from the formation. The polymers used for this purpose are often said to be used for "mobility" control.

Another problem encountered in fluid flooding is that certain injected drive fluids may be much lighter than the reservoir fluids and thus separate by gravity, rising toward the top of the flowing region and resulting in the bypassing of the lower regions. This phenomena is known as gravity override.

Also encountered in the use of the various flooding techniques is a problem brought about by the fact that different regions or strata may have different permeabilities. When this is encountered, the drive fluid can preferentially enter regions of higher permeability due to their lower resistance to flow. The regions of lower permeability, where significant volumes of oil often reside, are left unswept and do not benefit from the use of such secondary or tertiary recovery techniques.

It is therefore often desirable to plug the regions of high permeability, or "thief" zones, either partly or entirely, so as to divert the drive fluid into regions of lower permeability. The mechanical isolation of these thief zones has been tried but vertical communication among reservoir strata often renders this method ineffective. Physical plugging of the high permeability regions by cements and solid slurries has also been tried with varying degrees of success; however, these techniques have the drawback that still-productive sites may be permanently closed.

As a result of these earlier efforts, the desirability of designing a viscous slurry capable of sealing off the most permeable layers so that the drive fluid would be diverted to the underswept, "tighter" regions of the reservoir, became evident. This led to the use of oil/water emulsions, as well as gels and polymers for controlling formation permeability. This process is frequently referred to as "profile" control, a reference to the control of the vertical permeability profile of the reservoir. Profile control agents which have been proposed include oil/water emulsions and polymeric gels, with polymeric gels being the most extensively applied in recent years.

There are a variety of materials commercially available for profile control, all of which perform differently and have their own, often unique limitations. Among the many polymers examined are polyacrylamides, polysaccharides, celluloses, furfural-alcohol and acrylic-epoxy resins, silicates and polyisocyanurates. For polyacrylamides, see J. C. Mack, "Process Technology Improves Oil Recovery," SPE 7179, *SPE Rocky Mountain Regional Meeting*, May 17-19, 1978, Cody, Wyo.; W. G. Routson, M. Neale, and J. R. Penton, "A New Blocking Agent for Water Channeling," SPE 3992, 47th Annual Fall Meeting of SPE-AIMR, Oct. 8-11, 1972, San Antonio; D. Sparlin, "An Evaluation of Polyacrylamides for Reducing Water Production," *J. Pet. Tech.*, 906-914, Aug., 1976; and G. P. Willhite and D. S. Jordan, "Alteration of Permeability in Porous Rocks with Gelled Polymers," 1981 *ACS Meeting*, Aug. 23-28, New York, Polymers Preprints. For polysaccharides, see R. W. Farley, J. F. Ellebracht, and R. H. Friedman, "Field Test of Self-Conforming Oil Recovery Fluid," SPE 5553, *50th Annual Fall Meeting of SPE-AIME*, Sept. 28-Oct. 1, 1975, Dallas. For furfural-alcohol and acrylic/epoxy resins, see R. H. Knapp, M. E. Welbourn, "Acrylic/Epoxy Emulsion Gel System for Formation Plugging: Laboratory Development and Field Testing for Steam Thief Zone Plugging," SPE 7083, *Symposium on Improved Oil Recovery*, Apr. 16-19, 1978, Tulsa; and P. H. Hess, C. O. Clark, C. A. Haskin and T. R. Hall, "Chemical Method for Formation Plugging," *J. Pet. Tech.*, 559-564, May, 1971. For polyisocyanurates, see C. T. Presley, P. A. Argabright, R. E. Smith, and B. L. Phillips, "A New Approach to Permeability Reduction," SPE 4743, *Symposium on Improved Oil Recovery*, Apr. 22-24, 1974 Tulsa).

A major part of the work conducted in this area has dealt with polyacrylamides. Polyacrylamides have been used both in their normal, non-crosslinked form as well as in the form of crosslinked metal complexes, as described, for example, in U.S. Pat. Nos. 4,009,755, 4,069,869 and 4,413,680. In either form, the beneficial effects derived from these polyacrylamides seem to dissipate rapidly due to shear degradation during the injection of gels formed above ground. To overcome this problem and achieve deeper penetration into the reservoir, dilute solutions of these polymers have sometimes been injected first and then complexed in-situ. For example, in one such process, three sequential injection steps are employed: cationic polyacrylamides are injected first for strong adsorption and anchoring onto the generally anionic sites of the reservoir rock surfaces, followed by chelation with aluminum ions provided by aluminum citrate or with chromium ions generated by the in-situ reduction of dichromate ions and finally, anionic polyacrylamides are injected for the formation of the desired cationic polymer-metal ion-anionic polymer complexes (J. E. Hassert, and P. D. Flemming, III, "Gelled Polymer Technology for Control of Water in Injection and Production Wells," *3rd Conferences on Tertiary Oil Recovery*, University of Kans., Lawrence, 1979).

In general, there are two ways to deliver polymer gels into the formation. The first method is to inject gelled polymer into the formation. This is the so-called surface gelation method. The advantage of this method is that the polymer will enter the loose zone in preference to the tight zone because of the high viscosity of gelled polymer. The other advantage is that gelation is ensured because the gel is prepared on the surface. The disadvantage of this method is that the polymer gel will probably not penetrate far enough to block a high pore volume of the designated zone at low pumping pressures and low pumping rates, especially when the pressure drop occurs rapidly within a small radius of the injection wellbore. At high pumping pressures and flow rates, there are increased risks of fracturing the reservoir and degrading the gel structure by high shear forces.

The second method is the so-called in-situ gelation method, in which separate slugs of polymer, one containing an inactive crosslinker (such as dichromate) and the other activator (reducing agents such as thiourea and bisulfite), are injected sequentially into the reservoir. Gelation occurs when the two parts meet in the reservoir. With this method, shear degradation is reduced and the penetration of polymer is improved because of the lower viscosity of the ungelled polymer. However, a disadvantage of this method is that there is no guarantee that the two slugs of treatment will be placed in the same area and mixed well enough to form a strong gel. To avoid this problem, it would be advantageous to inject the constituents of the gel-forming composition simultaneously, or after first premixing them prior to injection. However, the majority of gel-forming compositions known in the art are relatively fast acting in that they begin to gel relatively quickly which can inhibit the proper placement of large volume treatments.

Profile control treatments must be properly performed for maximum effect; large treatments, injected over many days, are often needed. In most reservoirs thief zones are not isolated from other zones. If a small amount of the thief zone is plugged with a profile control treatment, injected fluids may be diverted only for a few feet away from the wellbore and soon find their way back into the thief zone. Much larger profile control treatments, while suffering from the same problem, will recover much more oil because a much larger volume of the reservoir will be swept before the fluids flow back into the thief zone.

In thick reservoirs or those with large well spacing, several days are often required to pump the profile control treatment into place due to the large volume of injectant necessary. Also a factor is that the pumping rate to place a profile control gel is usually limited by the parting pressure of the reservoir. Together, these factors require in-situ gelling profile control formulations to crosslink very slowly. For example, if five weeks are needed to place the treatment, it must be designed to gel in five weeks. While certain "delayed" chromium-based crosslinking agents capable of producing gel times on the order of about two to three weeks are disclosed in U.S. Pat. No. 4,606,407, which is hereby incorporated by references in its entirety, additional crosslinking agents capable of producing still more delayed reactions are required for treating the larger reservoirs such as those of the North Sea.

Therefore, what is needed is a composition capable of slowly forming a gel under prevailing subterranean conditions that enhances the ability to provide large, effective profile control treatments in zones of high permeability within an oil-bearing reservoir.

Accordingly, it is an object of the present invention to provide an aqueous-based polymeric gel-forming composition which will slowly form a stable gel in-situ.

It is another object of the present invention to provide a novel gel-forming composition that increases the effectiveness of large profile control treatments.

It is a further object of the present invention to provide a substantially stable gel which is not adversely affected by the temperature, salinity or pH level which prevails under subterranean formation conditions.

It is yet another object of the present invention to make profile control treatments for use in fluid flooding enhanced oil recovery operations practical.

It is a yet further object of this invention to provide a process for selectively plugging regions of higher permeability within an oil-bearing subterranean formation to obtain improved sweep efficiency during a fluid flood oil recovery operation.

Other objects, aspects and the several advantages of the present invention will become apparent to those skilled in the art upon a reading of the specification and the claims appended thereto.

SUMMARY OF THE INVENTION

According to the present invention, there is provided an aqueous-based polymeric composition capable of forming a gel under subterranean formation conditions comprising water, a viscosifying amount of a water-dispersible polymer and a crosslinking agent which is comprised of an aldehyde and a member selected from the group consisting of phenolic esters, naphtholic esters, halogenated phenolic esters and halogenated naphtholic esters, in an amount effective to cause gelation of the aqueous solution of said water dispersible polymer. These gel-forming compositions are useful in various fluid flooding enhanced oil recovery operations, including water, steam and carbon dioxide flooding where improved sweep efficiency is desired. Also, a process for controlling the permeability of subterranean formation is provided.

DESCRIPTION OF THE PREFERRED EMBODIMENTS

Any water-soluble or water-dispersible polymer capable of forming aqueous gels in the presence of an organic crosslinking agent can be used in the practice of this invention. Polymers of natural origin and biopolymers may be used. Preferred polymers include the various polyacrylamides and related polymers which are either water-soluble or water-dispersible and which can be used in an aqueous medium with the gelling agents described herein to yield an aqueous gel. These can include the various substantially linear homopolymers and copolymers of acrylamide and methacrylamide. By substantially linear is meant that the polymers are substantially free of crosslinking between the polymer chains. The polymers can have up to about 50 percent of the carboxamide groups hydrolyzed to carboxyl groups. However, as the degree of hydrolysis increases, the polymers often become more difficult to disperse in brines, especially hard brines. As used herein and in the claims, unless otherwise specified, the term "hydrolyzed" includes modified polymers wherein the carboxyl groups are in the acid form and also such polymers wherein the carboxyl groups are in the salt form, provided said salts are water-dispersible. Such salts include the ammonium salts, the alkali metal salts, and others which are water-dispersible. Hydrolysis can be carried out in any suitable fashion, for example, by heating an aqueous solution of the polymer with a suitable amount of sodium hydroxide.

Examples of copolymers which can be used in the practice of the invention include the water-dispersible copolymers resulting from the polymerization of acrylamide or methacrylamide with an ethylenically unsaturated monomer. It is desirable that sufficient acrylamide or methacrylamide be present in the monomer mixture to impart to the resulting copolymer the above-described water-dispersible properties. Any suitable ratio of monomers meeting this condition can be used. Under proper conditions of use, examples of suitable ethylenically unsaturated monomers include acrylic acid, methacrylic acid, vinylsulfonic acid, vinylbenzylsulfonic acid, vinylbenzenesulfonic acid, vinyl acetate, acrylonitrile, methyl acrylonitrile, vinyl alkyl ether, vinyl chloride, maleic anhydride, vinyl-substituted cationic quaternary ammonium compounds, and the like. Various methods are known in the art for preparing said copolymers. For example, see U.S. Pat. Nos. 2,625,529, 2,740,522, 2,727,557, 2,831,841, and 2,909,508. These copolymers can be used in the hydrolyzed form, as discussed above for the homopolymers.

A group of copolymers useful in the practice of the present invention are the copolymers of acrylamide or methacrylamide and a monomer such as the well known 2-acrylamido-2-methyl-propanesulfonic acid (AMPS®) monomer. (AMPS® is the registered trademark of the Lubrizol Corporation of Cleveland, Ohio.) Useful monomers, such as the AMPS® monomer, and methods for their preparation are described in U.S. Pat. Nos. 3,507,707 and 3,768,565, the disclosures of which are incorporated by reference. The AMPS® monomer is commercially available from the Lubrizol Corporation. The alkali metal salts, such as sodium 2-acrylamido-2-methylpropane sulfonate are also useful in the practice of this invention. These are also readily available.

Copolymers of acrylamide with said AMPS® monomer, and/or its sodium salt, are known and useful in the practice of this invention. For an example of such a copolymer, see the above-mentioned U.S. Pat. No. 3,768,565. A number of these copolymers are available from Hercules Incorporated, Wilmington, Del.; for example, Hercules SPX-5024, a 90:10 acrylamide/AMPS® sodium salt copolymer; Hercules SPX-5022, an 80:20 acrylamide/AMPS® sodium salt copolymer; Hercules SPX-5023, a 50:50 acrylamide/AMPS® sodium salt copolymer; and Hercules SPX-5025, a 30:70 acrylamide/AMPS® sodium salt copolymer.

Another group of copolymers useful in the practice of the invention are the copolymers of acrylamide or methacrylamide with a monomer such as those which are the subject of U.S. Pat. No. 3,573,263, the disclosure of which is incorporated by reference in its entirety. These useful monomers include the well known commercially available material (acryloyloxyethyl) diethylmethyl ammonium methyl sulfate, commonly referred to as DEMMS and the commercially available material (methacryloyloxyethyl) trimethylammonium methylsulfate also known as MTMMS.

Copolymers of acrylamide with said DEMMS monomer are commercially available, for example, an 80:20 acrylamide/DEMMS copolymer. Copolymers of acrylamide with said MTMMS monomer are also commercially available, for example, Hercules Reten®210, a 90:10 acrylamide/MTMMS copolymer; and Hercules Reten®220, an 80:20 acrylamide/MTMMS copolymer.

A particularly preferred polymeric material for use in the practice of this invention is the class of high molecular weight vinyl lactum polymers and copolymers disclosed in U.S. Pat. No. 4,644,020, which is hereby incorporated herein in its entirety. An example of a commercially available copolymer of this type is Phillips HE-B®, which is a copolymer of N-vinyl-2-pyrrolidone and acrylamide. This thermally stable, brine tolerant copolymer is available from Phillips Petroleum Company, Inc., of Bartlesville, Okla.

A preferred class of biopolymers which may be used include the polysaccharides produced by the action of bacteria of the genus Xanthomonas on a carbohydrate. The Xanthomonas polysaccharides, their method of preparation, their use in various applications in the petroleum industry are well known and are described, for example, in U.S. Pat. Nos. 3,243,000, 3,305,016, 3,208,518, 3,810,882 and 4,413,680, to which reference is made for disclosures of these materials, their preparation and their use. Other polymers of natural origin that may be used include cellulose polymers, e.g., the hydroxyalkyl celluloses and carboxyalkyl celluloses and their alkali metal and ammonium salts, as described in U.S. Pat. Nos. 4,009,755, 4,069,869 and 4,413,680, to which reference is made for a detailed description of these polymers.

A particular polysaccharide which is commercially available and is preferred for use in the present invention is the ionic polysaccharide B-1459 produced by fermentation of glucose with the bacterium Xanthomonas Campestris (NRRL B-1459, U.S. Department of Agriculture). This polysaccharide is produced by culturing the bacterium Xanthomonas Campestris in a well aerated medium having a pH of about 7 which contains commercial glucose, organic nitrogen sources, dipotassium hydrogen phosphate and appropriate trace elements. This polymer is available from the Kelco Chemical Company under the trade name "Kelzan", from Pfizer under the trade name "Flocon" and from other commercial sources.

Another biopolymer which may be employed in the practice of the invention disclosed herein is the nonxanthan welan gum heteropolysaccharide biopolymer S-130 produced by fermentation under aerobic conditions of a bacterium of the Alcaligenes species, ATCC 31555. This polysaccharide is described in U.S. Pat. No. 4,342,866 to which reference is made for a description of it and of the method by which it may be produced.

S-130 is commercially available from the Kelco Oil Field Group, a division of Merck and Co., Inc.

The polymers are generally used at concentrations ranging from 1,000 to 5,000 ppm in order to achieve the desired gel consistency; in most cases, however, concentrations of 1,000 to 3,000 ppm will be adequate and about 2,000 ppm is normally preferred, although reservoir conditions may require other concentrations.

The crosslinking agents capable of providing the desired delayed gelation of an aqueous solution of the preferred polymeric materials are formed by the combination of an aldehyde compound with an esterified phenol or naphthol or their halogenated derivatives. This combination may be achieved by simple mixing, either prior to combining with an aqueous solution of the polymeric material or separately, "on-the-fly", while injecting the gel-forming mixture into the formation.

Although, generally, the gel-forming mixture will be injected via an injection well in fluid communication with the formation and its production well or wells, it is within the scope of the present invention to inject the mixture via the production well or wells, either, instead of, or in addition to injection via the injection well. Circumstances will dictate which of these injection approaches is most effective.

A broad range of water-dispersible aldehydes are useful in the practice of the present invention. It is known that both aliphatic and aromatic monoaldehydes and dialdehydes can be used. The useful aliphatic monoaldehydes include those containing from one to ten carbon atoms per molecule, such as formaldehyde, paraformaldehyde, acetaldehyde, proprionaldehyde, butylaldehyde, isobutylaldehyde, heptaldehyde and others. Among the useful dialdehydes are glyoxyl, glutaraldehyde and terephthaldehyde. Mixtures of the various, aforementioned aldehydes are also useful in the practice of the present invention. Of the preferred aldehyde compounds, formaldehyde is particularly preferred.

The use of basic, non-esterified, phenolic or naphtholic materials to form crosslinking agents useful in the gelation of polymeric profile control agents is known, having been disclosed in U.S. Pat. Nos. 4,246,124, and 4,440,228 as well as in Ser. No. 283,399, filed on Dec. 12, 1988, which are hereby incorporated by reference in their entirely. As such, a good selection of fast organic crosslinkers exists. As is known, phenol (with formaldehyde) can gel polyacrylamides overnight at 210° F. Resorcinol reacts faster because it has two activating hydroxyls. Various catechol and substituted phenols and naphthols can be predicted by those skilled in the art to react faster and slower than phenol and resorcinol. Electron withdrawing or stericly hindering groups can be placed on a phenol to slow its crosslinking rate. Activating groups, other than hydroxyls, can be placed on benzene to enhance its crosslinking rate. Some of these methods have been found to be counterproductive (e.g. stericly hindering groups). Maintaining water solubility has been a problem.

The preferred delayed crosslinking agents required for the practice of the present invention utilize so-called "hidden" phenolics and naphtholics as easily accessible, inexpensive families of slow reacting crosslinkers. These are protected phenols and naphthols which hydrolytically or thermally deprotect in-situ to form active crosslinkers. The rate of deprotection is rate limiting. Protecting groups are selected from those known to derivatize hydroxyls (e.g. acetates). Water solubility can be enhanced by derivatizing parent materials with solubility enhancing derivatives or by reacting the parent material with formaldehyde such as by heating with or without a catalyst.

The preferred family of hidden phenolics and naphtholics are the esterified phenolics and naphtholics and their halogenated derivatives. Particularly preferred are the esters derived from the reaction of phenol or naphthol with acetic acid, benzoic acid and carbonic acid; with the most preferred compounds being phenyl acetate, $C_6H_5OOCCH_3$; phenyl benzoate, $C_6H_5CO_2C_6H_5$; 1-naphthyl acetate, $CH_3CO_2C_{10}H_7$; and, 2-naphthyl acetate, $CH_3CO_2C_{10}H_7$. Of the halogenated esters, phenyl chloroacetate is particularly preferred. All of the aforementioned compounds useful in forming the crosslinking agents preferred for the practice of the present invention are available from the Aldrich Chemical Company, Inc. of Milwaukee, Wis.

As disclosed in Ser. No. 284,626, filed Dec. 15, 1988, incorporated herein by reference in its entirety, it is often desirable to improve the ability of a profile control agent designed for in-situ gelation to selectively enter the zones of higher permeability within a formation. This is accomplished by combining the in-situ gel-forming composition with an ex-situ gel-forming composition which is shear thinning on injection into the formation. Biopolymers such as the aforementioned Xanthan biopolymer or welan gun heteropolysaccharide, when crosslinked, have the desired characteristics necessary to improve selectivity yet achieve the objects of the present invention. It is therefore within the scope of this invention to employ the method of Ser. No. 284,626 in the practice of the invention disclosed herein.

The following data demonstrate the beneficial results obtained with the novel polymeric gels of the present invention. The invention is illustrated by the following non-limiting examples:

EXAMPLES

EXAMPLE 1

This example demonstrates that phenol, when combined with an aldehyde, gels a polyacrylamide relatively quickly at 210° F. A solution of Phillips HE-B ® polyacrylamide (5000 ppm), phenol (1000 ppm), and formaldehyde (1900 ppm) was prepared in synthetic sea water (pH unadjusted). When aged overnight (15 hours) at 210° F., a tough, deformable, elastic gel was formed. This gel showed no syneresis or other evidence of degradation after 26 weeks of storage of 210° F.

EXAMPLE 2

This example shows that phenyl acetate, when combined with an aldehyde, gels a polyacrylamide much slower than a phenol/formaldehyde organic crosslinking agent. A solution of Phillips HE-B ® (5000 ppm), phenyl acetate (1500 ppm) and formaldehyde (1900 ppm), was prepared in synthetic sea water (pH unadjusted). This solution gelled after seven weeks of storage at 210° F.

EXAMPLE 3

This example also demonstrates that phenol will gel a polyacrylamide relatively quickly. A solution of the xanthan biopolymer, Flocon ®4800, (2000 ppm), Phillips HE-B ® (5000 ppm), phenol (1000 ppm), formaldehyde (1900 ppm), $CrCl_3$ (100 ppm Cr) was prepared in synthetic sea water. Sodium hydroxide (1N) was used to adjust the pH to 5.85. The composition so prepared gelled in one hour, presumably from the interaction of Cr with the Flocon ® biopolymer. This blend was left to fully crosslink overnight, then liquefied in a Waring blender for 30 seconds and placed in an ampoule. The ampoule was then stored at 210° F. An elastic gel was formed between 6 and 22 hours. Three weeks later, the gel was observed to still be firm, with <5% syneresis.

EXAMPLE 4

This example shows phenyl acetate gels a like polyacrylamide solution slower than phenol. A solution of Flocon ®4800 (2000 ppm), Phillips HE-E ® (5000 ppm), phenyl acetate (1500 ppm), formaldehyde (1900 ppm), sodium hydroxide (500 ppm was required to adjust the pH to 5.85), and $CrCl_3$ (100 ppm Cr) was prepared in synthetic sea water. The solution gelled overnight, again presumably from the interaction of Cr with the Flocon ® biopolymer. This was liquefied in a Waring blender for 30 seconds, placed in an ampoule and stored at 210° F. After nine days, a loose elastic gel had formed. After four additional days, the gel was observed to be moderately stiff. Two weeks later, the gel remained moderately stiff, with minimal syneresis.

EXAMPLE 5

This example demonstrates that phenyl benzoate, when combined with an aldehyde, gels a polyacrylamide much slower than would a phenol/aldehyde crosslinking agent. A solution of Phillips HE-B ® (5000 ppm), phenyl benzoate (2000 ppm) and formaldehyde (1900 ppm) was prepared in synthetic sea water (pH unadjusted). This solution was observed to have gelled after nine weeks of storage at 210° F., versus overnight for the phenol/formaldehyde-crosslinked composition of Example 1.

EXAMPLE 6

This example indicates a compound must be hydrolyzable to crosslink. When anisole (1000 ppm) was substituted for the phenol compound of Example 1, no gel formed, even after aging for 26 weeks at 210° F. Anisole is known not to hydrolyze under these conditions.

Where it is desired to obtain increased sweep efficiency, gels of this invention can be used to plug a previously swept portion of a formation. These gels can be directed to areas of increased porosity by utilizing any of the methods well-known to those skilled in the art. The permeability control treatment may additionally be carried out periodically, when necessary, to achieve the desired permeability profile.

One method where gels of this invention can be utilized is during a waterflooding process for the recovery of oil from a subterranean formation. After plugging the more permeable zones of a reservoir with the novel gels of this invention, a waterflooding process can be commenced or resumed. U.S. Pat. No. 4,479,894, issued to Chen et al., describes one such waterflooding process. This patent is hereby incorporated by reference in its entirety.

Steamflood processes which can be utilized when employing the gels described herein are detailed in U.S. Pat. Nos. 4,489,783 and 3,918,521 issued to Shu and Snavely, respectively. These patents are hereby incorporated by reference herein.

Gels described herein can also be used in conjunction with a carbon dioxide flooding process, either alone, or in conjunction with a cyclical steam stimulation in a heavy oil recovery process to obtain greater sweep efficiency. Cyclic carbon dioxide steam stimulation can be commenced or resumed after plugging the more permeable zones of the reservoir with the novel gels of this invention. A suitable process is described in U.S. Pat. No. 4,565,249 which issued to Pebdani et al. This patent is hereby incorporated by reference in its entirety. Increased sweep efficiency can be obtained when the subject gels are used in combination with a carbon dioxide process for recovering oil. Prior to commencement or resumption of the carbon dioxide process, the more permeable zones are plugged with these novel gels.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. A process for recovering oil from a subterranean oil-bearing formation having relatively high permeability zones and relatively low permeability zones penentrated by at least one injection well and at least one production well comprising the steps of:
   (a) injecting into the relatively high permeability zones of the formation an aqueous gel-forming solution comprising water, a vicosifying amount of a water-dispersible polymer; and a crosslinking agent in an amount effective to cause gelation of the aqueous solution of said water-dispersible polymer, said crosslinking agent comprising a mixture of an aldehyde and a member selected from the group consisting of phenolic esters, naphtholic esters, halogenated phenolic esters and halogenated naphtholic esters, whereby upon gelation of the solution the zones of relatively high permeabilty of the formation are selectively plugged;
   (b) injecting a flooding fluid into the formation via the injection well; and
   (c) recovering fluids including oil from the formation via the production well.

2. The process of claim 1, wherein in step (a) said aldehyde is selected from the group consisting of aliphatic monoaldehydes, aromatic monoaldehydes, aliphatic dialdehydes, aromatic dialdehydes and mixtures thereof.

3. The process of claim 2, wherein in step (a) said aldehyde is formaldehyde.

4. The process of claim 3, wherein in step (a) said phenolic ester comprises phenyl acetate.

5. The process of claim 3, wherein in step (a) said phenolic ester comprises phenyl benzoate.

6. The process of claim 3, wherein in step (a) halogenated phenolic ester comprises phenyl chloroacetate.

7. The process of claims 4, 5, or 6, wherein in step (a) said polymer is selected from the group consisting of polyacrylamides, polysaccharides, heteropolysaccharides, cellulose ethers and mixtures thereof.

8. The process of claim 7, wherein in step (a) the gel-forming solution is injected via the injection well.

9. The process of claim 7, wherein in step (a) the gel-forming solution is injected via the production well.

10. The process of claim 7, wherein in step (a) the gel-forming solution is injected via both the injection well and the production well.

11. The process of claim 7, wherein the solution of step (a) further comprises a transition metal crosslinked Xanthan biopolymer in an amount effective to impart selectivity to the solution during injection into a subterranean formation.

12. The process of claim 7, wherein in step (b) said flooding fluid is steam.

13. The process of claim 7, wherein in step (b) said flooding fluid is water.

14. The process of claim 7, wherein in step (b) said flooding fluid is carbon dioxide.

15. The process of claim 7, wherein in step (b) said flooding fluid is water alternated with carbon dioxide.

* * * * *